(12) United States Patent
Fuchs et al.

(10) Patent No.: US 10,663,233 B2
(45) Date of Patent: May 26, 2020

(54) ENERGY STORE

(71) Applicant: VIESSMANN WERKE GMBH & CO. KG, Allendorf (Eder) (DE)

(72) Inventors: Sven Fuchs, Stuttgart (DE); Adnan Ribic, Stuttgart (DE); Moritz Pfannkuch, Stuttgart (DE); Manfred Vaupel, Frankenberg (DE)

(73) Assignee: VIESSMANN WERKE GMBH & CO. KG, Allendorf (Eder) (DE)

( * ) Notice: Subject to any disclaimer, the term of this patent is extended or adjusted under 35 U.S.C. 154(b) by 94 days.

(21) Appl. No.: 16/078,695

(22) PCT Filed: Feb. 22, 2017

(86) PCT No.: PCT/EP2017/054072
§ 371 (c)(1),
(2) Date: Aug. 22, 2018

(87) PCT Pub. No.: WO2017/144537
PCT Pub. Date: Aug. 31, 2017

(65) Prior Publication Data
US 2019/0056181 A1 Feb. 21, 2019

(30) Foreign Application Priority Data
Feb. 26, 2016 (DE) .................. 10 2016 103 473

(51) Int. Cl.
F28D 20/02 (2006.01)

(52) U.S. Cl.
CPC ............ *F28D 20/021* (2013.01); *F28D 20/02* (2013.01); *F28D 20/028* (2013.01); *Y02E 60/14* (2013.01); *Y02E 60/145* (2013.01)

(58) Field of Classification Search
CPC ...... F28D 20/02; F28D 20/021; F28D 20/028; Y02E 60/145; Y02E 60/147
(Continued)

(56) References Cited

U.S. PATENT DOCUMENTS 6,053,006 A 4/2000 Kimborn
7,069,979 B2 * 7/2006 Tobias ............... H02K 9/20
165/10

FOREIGN PATENT DOCUMENTS

DE 2837091 A1 3/1980
DE 102004052447 A1 4/2006
(Continued)

OTHER PUBLICATIONS

International Search Report (dated Jun. 2, 2017) for corresponding International App. PCT/EP2017/054072.

*Primary Examiner* — Joel M Attey
(74) *Attorney, Agent, or Firm* — WRB-IP LLP

(57) ABSTRACT

An energy store includes a housing having a storage medium with latent heat during a phase transfer, which is provided during operation for solidifying into a solid phase and for melting into a liquid phase, including a first storage region which is provided at least periodically for the solid phase and in which an extractor heat exchanger is arranged for extracting heat, wherein the first storage region has a vertical axis, including a second storage region provided for the liquid phase, when the solid phase is present in the first storage region, wherein at least sections of the second storage region are provided as a casing around the first storage region, wherein at least one portion of a regeneration device is arranged in the second storage region for supplying heat. Same has a first and a second passage device for introducing and discharging for the liquid phase, wherein the first and/or the second passage device has a passage section with passage openings for the liquid phase, which is arranged with at least regions of the longitudinal extension thereof arranged about the vertical axis.

15 Claims, 4 Drawing Sheets

(58) Field of Classification Search
USPC .......................................................... 165/10
See application file for complete search history.

(56) References Cited

FOREIGN PATENT DOCUMENTS

| | | |
|---|---|---|
| DE | 102010006882 A1 | 8/2011 |
| DE | 202015008836 U1 | 2/2016 |
| EP | 2428760 A2 | 3/2012 |
| JP | 2001201284 A | 7/2001 |

\* cited by examiner

ENERGY STORE

BACKGROUND AND SUMMARY

The invention relates to an energy store with a housing, which surrounds a storage medium having latent heat in the case of a phase transition, which storage medium is provided during operation as intended for solidification into a solid phase and for melting into a liquid phase.

EP 2 686 633 A1 discloses a latent heat store, in the case of which water is used as the storage medium. The latent heat store supplies a building with heat via a heart pump. The latent heat store is discharged if the water in the latent heat store is solidified and is charged if the water in the latent heat store is liquid. The targeted freezing and thawing of the storage medium occurs on the basis of seasonal change. During the warm season, the latent heat store can also be used for cooling purposes. Solidifying and liquefying the storage medium can be carried out in each case continuously over long periods of time on the basis of seasonal change.

In this case, an extraction heat exchanger extracts heat from the water, wherein, in the case of long-term heat extraction in winter, the water around the extraction heat exchanger freezes slowly and in a controlled manner. The ice around the extraction heat exchanger can be melted again by means of the supply of heat via a regeneration heat exchanger apparatus or solidification can be delayed. Here, a regeneration heat exchanger is used which is arranged as a pipe coil in several windings in the housing and surrounds the extraction heat exchanger. As a result of the extraction heat exchanger, it is possible to extract heat out of the energy store up to a predetermined maximum degree of solidification of the storage medium. As long as there is ice in the energy store, it is also possible to provide cooling power from the energy store in particular in the warm season. More flexible regeneration can be achieved by providing additional regeneration heat exchangers.

It is desirable to provide an energy store, in the case of which the flexibility of the regeneration of the storage medium and the regeneration capacity of the energy store can be improved.

The invention proceeds, according to an aspect thereof from an energy store with a housing, which surrounds a storage medium having latent heat in the case of a phase transition, which storage medium is provided during operation as intended for solidification into a solid phase and for melting into a liquid phase, with a first storage region in the interior of the housing, which is provided at least temporarily for solid phase of the storage medium and in which an extraction heat exchanger is arranged, which is provided for the extraction of heat from the storage medium, wherein the first storage region has a longitudinal extension which is oriented in the intended state of use as a vertical axis; with a second storage region in the interior of the housing, which is provided for liquid phase of the storage medium, if solid phase is present in the first storage region, wherein the second storage region is provided at least in regions as a shell around the first storage region, wherein at least one part of a regeneration apparatus is arranged in the second storage region, which regeneration apparatus is provided for the supply of heat into the storage medium.

It is proposed that the regeneration device has at least one first and at least one second admission device for the liquid phase, wherein one of the admission devices is provided for the introduction of liquid phase into the housing and the other of the admission devices is provided for guiding liquid phase out of the housing. The first, and/or the second admission device has an admission portion with admission openings, which are opened toward the interior of the housing, for the liquid phase, wherein the admission portion is arranged with its longitudinal extension at least in regions about the vertical axis of the first storage region.

The energy store is preferably configured as a long-term store, in the case of which the storage medium in the first storage region is solidified slowly and in a targeted manner over a longer period of time by extraction of heat and subsequently liquefied again slowly and in a targeted manner by the supply of heat into the energy store. This can expediently be performed on a seasonally changing basis so that towards the end of winter the storage medium in the first storage region is fully solidified and towards the end of summer the storage medium in the first storage region is fully liquefied.

Due to the fact that at least one of the admission devices is arranged in the second storage region, this is surrounded in the entire regular operating phase of the energy store by liquid storage medium so that it is ensured that this admission device can always discharge liquid storage medium. The other of the admission devices can also expediently be provided within the second storage region, in the liquid storage medium.

The first admission device and the second admission device of the regeneration apparatus form an open regeneration heat exchanger which is operated directly with the storage medium from the housing as heat carrier medium. A connection in terms of flow can preferably be provided outside the housing between the admission devices so that a closed circuit is formed. Due to the fact that in particular cooled storage medium is removed directly from storage medium volume in the housing and in particular heated storage medium is again supplied to the storage medium volume, the amount of heat introduced into the storage medium volume can be varied very flexibly and as required within wide limits. A flow which is formed between the admission devices in the storage medium can be used for the transfer of heat. This is possible as a result of the slow build-up of the solid phase in the discharge phase of the energy store and the slow liquefying of the solid phase in the charging phase of the energy store. A circulation apparatus for the storage medium in the housing is not necessary, rather can even negatively influence the slow build-up and reduction of the solid phase.

The first storage region can stand on the base of the housing or be spaced apart therefrom so that liquid storage medium can be present under the first storage region. The second storage region can fully enclose the first storage region as a shell or surround the majority of the first storage region as a shell.

In the prior art, however, an indirect exchange of heat takes place since a separate heat carrier medium which does not reach the storage medium flows in the conventional regeneration heat exchangers. Fixed limits for the exchange of heat are therefore set for the construction of the conventional regeneration heat exchanger.

The flow connection between first admission device and second admission device can advantageously be arranged outside the housing. At least one heat exchanger can then particularly expediently be provided in the flow connection. It is, however, also conceivable to provide the flow connection within the housing in a storage medium-free storage region and supply heat there.

The construction of the first and second admission device according to the invention can be very simple, for example, a simple pipe section within the housing. The conventional regeneration heat exchangers are fixed in their maximum energy input by their surface. The energy input of the open regeneration heat exchanger can be reliably varied and controlled by the regeneration apparatus according to the invention in the form of an open regeneration heat exchanger by a variation of the volume flow of the storage medium flowing in said regeneration apparatus as well as by the heat input in the housing-external connection in terms of flow of first admission device and second admission device. This is advantageous precisely in the case of an increased cooling requirement if the energy store is supposed to be used for cooling.

A conventional coiled regeneration heat exchanger can be omitted. It is, however, conceivable that, in a further configuration, one or more conventional, coiled regeneration heat exchangers can additionally be provided in the housing.

The housing can advantageously be arranged in the ground. The housing can advantageously be installed close to the ground. An extraction heat exchanger which is of layer-type structure can particularly advantageously be arranged in the first storage region. Heat exchanger tubes, for example, in the form of a flat spiral can be arranged in each layer. The housing can advantageously be manufactured from concrete. In particular, it is advantageous for operation as a long-term store if the housing is not insulated with respect to the surroundings. In the case of installation in the ground, the relatively constant temperature of the ground in summer can be used to additionally introduce heat into the storage medium in the housing.

Solidification of the storage medium can be carried in a spatially controlled manner, e.g. from the inside to the outside, by suitable variation of the spacings of the heat exchanger tubes and the layers. Melting of the storage medium can be carried out in reverse from the outside to the inside. The spacings of the heat exchanger tubes and/or the spacings of the layers of the extraction heat exchanger are advantageously formed so that, in the case of heat withdrawal, continuous solidification is carried out, in particular from the inside to the outside and, in the case of the supply of heat, continuous thawing of the storage medium is carried out, in particular from the outside to the inside. If the energy store is fully discharged, the first storage region is fully solidified, i.e. the degree of solidication is 100%. In contrast, the storage medium in the second storage region which surrounds the first storage region is not solidified.

The spacings of the heat exchanger tubes and/or the spacings of the layers of the extraction heat exchanger are advantageously selected such that no cavities surrounded by solid storage medium with liquefied storage medium can be formed within the solidified storage medium in the first storage region during solidification and/or liquefying of the storage medium. It is thus possible to prevent the formation of areas with a bursting action which could damage the extraction heat exchanger or even the housing and/or inexpediently influence a transfer of heat between the heat exchanger tubes and the storage medium and/or make them uncontrollable as a result of volume changes between liquid phase and solidified phase of the storage medium.

The first and second admission device can have in each case one or more admission openings through which the storage medium can enter from the corresponding admission device into the housing and can escape from the housing. Several openings can be advantageously distributed so that as homogeneous as possible a distribution of the storage medium is possible when leaving the housing and during supply of the storage medium into the housing. The openings can expediently be distributed evenly along the first and/or second admission device. As homogeneous as possible a distribution of the storage medium when leaving the housing or the second storage region and during the supply of the storage medium into the housing or into the second storage region facilitates the targeted and directed solidification and liquefying of the storage medium in the first storage region.

According to one expedient configuration, the storage medium can occupy a total volume in the fully liquid state in the first and second storage region, wherein the first storage region is provided such that the volume of the first storage region, relative to the total volume, is between at least 70% and at most 95%, preferably between at least 75% and at most 90%, particularly preferably between at least 80% and at most 85%, of the total volume. As a result of this, it is ensured that the first storage volume is still surrounded by liquid storage medium in the second storage region even in the fully discharged state, i.e. in the case of a storage medium which fully solidified in the first storage region. The extraction heat exchanger is preferably configured so that the formation of the solid phase automatically arises when the maximum degree of discharge of the energy store is reached. As a result of the coordinated interaction of heat extraction by the extraction heat exchanger and supply of heat by the regeneration apparatus, the solidified storage medium remains within the first storage region and cannot solidify further. The storage medium in the second storage region can advantageously form a casing-type space with liquid storage medium around the first storage region. The casing-type space can be formed to be round or square.

According to one expedient configuration, the first admission device and the second admission device can be connected in terms of flow outside the first and second storage region by means of a flow connection. In this manner, a closed circuit can be formed. A heat exchanger can optionally be provided in the circuit and/or one or more heat sources can be connected to the circuit.

According to one expedient configuration, one of the admission devices can be arranged adjacent to a first end of the longitudinal extension and the other of the admission devices can be arranged adjacent to an opposite end of the longitudinal extension of the extraction heat exchanger. A flow can advantageously be generated within the housing, with which both the build-up and reduction of the solidified storage medium in the first storage region can be well controlled. The direction of flow can also be changed as a function of operating parameters of the energy store.

According to one expedient configuration, in an installation state as intended, the admission devices can be arranged on top of one another in the direction of the longitudinal extension. During operation, a flow within the housing from the upper side of the housing towards the base of the housing can advantageously be generated by the action of gravity, with which both the buildup and reduction of the solidified storage medium in the first storage region can be well controlled.

According to one expedient configuration, at least one of the admission devices can have an admission portion with admission openings for the storage medium which are distributed in particular equidistantly along a longitudinal extension of the admission portion. In this manner, a homogeneous input of heat inter the storage medium as well as a homogeneous removal of the liquid storage medium from the second storage region can be achieved and thus the reduction and the build-up of the solidified storage medium in the first storage region can be defined particularly precisely.

According to one expedient configuration, one of the admission devices can be arranged in a region in the housing which is free of storage medium during operation. In this case, the second admission device can act like a shower above the second storage region if storage medium is introduced by it and storage medium is guided out through the first admission device. A combination of segments of the second admission device which are arranged both within the second storage region and in the storage medium-free region is also conceivable.

According to one expedient configuration, the first admission device can have an admission portion which can be placed around the first storage region. This enables, in particular with equidistant admission openings in the admission portion, a homogeneous removal of the liquid storage medium out of the second storage medium or a homogeneous supply of the liquid storage medium into the second storage region. In one embodiment, it can be provided to additionally place the admission portion of the second admission device adjacent to the upper end of the longitudinal extension of the first storage region about the first storage region. It is expedient if the first and/or second admission device follow in particular the housing shape. It is expedient if a larger distance to the first storage region is provided than to the housing wall.

Openings in the first and/or second admission device can advantageously be directed towards the housing wall. During removal of storage medium by the corresponding admission device, it can be achieved that the storage medium is then free of solid phase and the admission device is not blocked with solid phase.

According to one expedient configuration, the second admission device can be arranged above the first storage region and the admission portion of the second admission device at least in regions can overlap a cross-section of the first storage region. This is particularly advantageous if the second admission device is arranged in a storage medium-free region in the housing.

According to one expedient configuration, the admission portion of the second admission device can be adapted to a shape of the cross-section of the first storage region. The flow within the storage medium can thus be configured to be more homogeneous, which is expedient for the build-up and the reduction of the solid phase of the storage medium.

According to one expedient configuration, the second admission device can be provided for the introduction of the liquid phase into the housing, and the first admission device can be provided for guiding the liquid phase out of the housing. This produces an expedient flow of the heat introduced into the storage medium.

According to one expedient configuration, a switching device can be provided to define a direction of flow of the liquid phase of storage medium in the flow connection between first and second admission device, in particular as a function of operating parameters of the energy store. The introduction of heat can be flexibly adjusted. Such a changing operation can advantageously be performed as a function of the temperature and/or density of the liquid storage medium in the energy store.

According to one expedient configuration, the solid phase of the storage medium in the first storage region can be formed substantially as a monolith. In the case of cuboid housings, the solid phase can, for example, occupy a cuboid space, while in the case of cylindrical housings, the solid phase can occupy a cylindrical space. This enables particularly easy control of the reduction and build-up of solidified storage medium in the first storage region. The cross-section of the solid phase can advantageously be controlled by an extraction heat exchanger in the first storage region.

According to one expedient configuration, the first storage region can be formed such that the solid phase of the storage medium forms, at the end of a defined solidification phase, concentric shells which are spaced apart by liquid phase. In this case, the second storage region projects into the first storage region. The shells can be self-enclosed or also be formed by spaced apart segments. Such a configuration of the solidified storage medium can be generated by suitable variation of the spacings of the heat exchanger tubes and the layers of the extraction heat exchanger, in the case of which the solidification of the storage medium can be carried out in a spatially controlled manner, i.e. in each cylinder from the inside to the outside. Melting of the storage medium can be carried out in reverse from the outside to the inside.

According to one expedient configuration, the flow connection of first and second admission device can comprise a heat exchanger, in particular a plate heat exchanger. Such a heat exchanger can absorb waste heat, for example, from a building supplied with the energy store, and supply it to the storage medium in the connection.

According to one expedient configuration, the first admission device can be arranged spaced apart from the housing. As a result of this, the first admission device can be better insulated with respect to the surroundings of the housing.

BRIEF DESCRIPTION OF THE DRAWINGS

Further advantages will become apparent from the following description of the drawing. Exemplary embodiments of the invention are represented in the figures. The figures, the description and the claims contain numerous features in combination. The person skilled in the art will expediently also consider the features individually and combine them to form expedient further combinations.

DETAILED DESCRIPTION

Components of the same type or with the same effect are designated by the same reference numbers in the figures. The figures merely show examples and are not to be understood in a restrictive manner.

Directional terminology used below with terms such as "left", "right", "top", "bottom", "in front", "behind", "after" and the like merely serves the purpose of better understanding of the figures and should in no way represent a restriction of the generality. The represented components and elements, their design and use can vary within the considerations of a person skilled in the art and be adapted to the respective applications.

Figure 1:
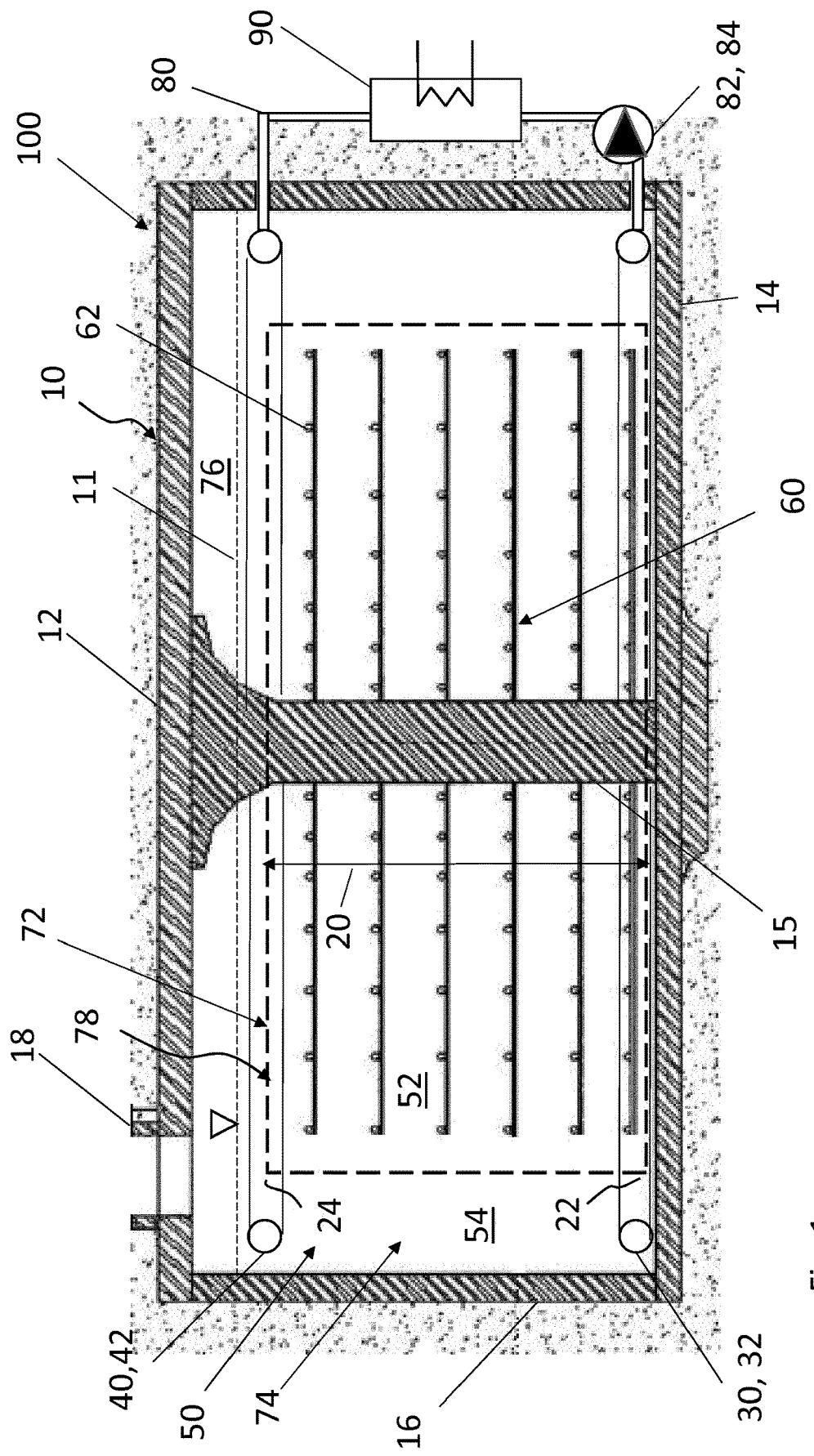
FIG. 1 shows, in sectional representation, an exemplary embodiment of the invention with first and second storage region and an extraction heat exchanger in the first storage region.

FIG. 1 shows, in sectional representation, an exemplary embodiment of an energy store 100 according to an exemplary embodiment of the invention. Energy store 100 has a housing 10 which is buried, for example, in the ground with a cover 12 and a base 14. An entry opening 18 is arranged in cover 12, which entry opening allows entry to housing 10. Housing 10 can be formed as a cylinder with a circular side wall 16. Other cross-sections of housing 10 are, however, also conceivable. Cover 12 is supported with a support 15 against base 14. Support 15 can be omitted in the case of smaller sizes of housing 10. Support 15 allows in particular cover 12 to be driven on, for example, in a car park or the like. Housing 10 can be formed in particular from concrete.

In housing 10, a storage medium 50 is filled up to a defined level 11. A storage medium-free storage region 76 which reduces the risk of cracking housing 10 during solidification of storage medium 50 is arranged above it. Storage medium 50 can be, for example, water which solidifies to ice at low temperatures and at the freezing point when melting can absorb a large amount of latent heat or discharge it when freezing without its temperature changing.

There is provided below level 11 a first storage region 72 which during operation as intended contains a solid phase 52 of storage medium 50 and a second storage region 74 for liquid phase 54 of storage medium 50 which surrounds first storage region 72.

The volume of solid phase 52 of storage medium 50 varies from a disappearing minimum, if no solid phase 52 is present at all, up to a maximum if a maximum amount of storage medium 50 has made a transition into solid phase 52. The configuration of the energy store is expediently configured so that liquid phase 54 is still present around first storage region 72 even in the discharged state of energy store 100. The formation of solid phase 52 can fully occur automatically in the case of complete discharge of energy store 100.

An extraction heat exchanger 60, which has several layers, which are arranged on top of one another and are not designated in greater detail, on which heat exchanger tubes 62 are wound, for example, spirally through which a heat carrier medium flow, is arranged within first storage region 72. Such an extraction heat exchanger is known, for example, from EP 1 807 672 B1. Extraction heat exchanger 60 is coupled, for example, to a heat pump and provides heat from energy store 100. During operation of extraction heat exchanger 60, it is possible to achieve highly controlled build up and reduction of solid phase 52 in first storage region 72. This is carried in each case over long periods of time on a seasonally changing basis.

First storage region 72 has a longitudinal extension 20 with a lower end 22 close to base 14 and an opposite upper end 24. In the installed state of use as intended, longitudinal extension 20 is oriented as a vertical axis. First storage region 72 has a cross-section 78 which is determined by extraction heat exchanger 60.

Storage medium 50 occupies in the fully liquid state in first and second storage region 72, 74 a total volume, wherein first storage region 72 is provided so that the maximum intended volume of storage medium 50 in the solidified state in first storage region 72, relative to the total volume, is between at least 70% and at most 95%, preferably between at least 75% and at most 90%, particularly preferably between at least 80% and at most 85%, of the total volume. It is thus ensured that solid phase 52 of storage medium 50 is surrounded by liquid phase 54 of storage medium 50. In the case of a cylindrical first storage region 72, second storage region 74 comprises an annular space around the cylinder with solid phase 52 of the storage medium.

A first admission device 30 is provided adjacent to lower end 22, while a second admission device 40 is provided adjacent to opposite end 24 of longitudinal extension 20. First admission device 30 comprises an admission portion 32 which, in this example, is formed as a curved tube. In the case of square housings, the tube can also follow the cross-section of the square housing. Second admission device 40 likewise comprises an admission portion 42 which is formed as a curved tube. Admission devices 30, 40 are a component of a regeneration apparatus and form an open regeneration heat exchanger.

Admission portion 32 of first admission device 30 with the equidistant openings can be oriented towards housing wall 16 for reliable ice-free removal. The tubes can be formed in each case as tube segments, e.g. semi-circles, which are closed at their ends, or the tubes can be self-enclosed, e.g. form a full circle or almost form a full circle. In each case equidistant openings for liquid storage medium 54 can be provided along the longitudinal extension of the tubes.

Liquid phase 54 of storage medium 50 at least in an operating mode in storage operation is removed from second storage region 74 by first admission device 30 and returned by second admission device 40. First admission device 30 and second admission device 40 are connected in terms of flow by means of a flow connection 80 outside housing 10. A heat exchanger 90, for example, a plate heat exchanger, which can advantageously input heat, in particular waste heat of a building or the like, into storage medium 50 which flows in flow connection 80, is arranged in flow connection 80 between first admission device 30 and second admission device 40.

Liquid storage medium 50 can be conveyed by means of a conveying pump 82 via first admission device 30 in second storage region 74 to second admission device 40.

Flow connection 80 is guided in the figures by way of example through housing wall 16. The conventional lines to admission devices 30, 40 and to extraction heat exchanger 60 can, however, expediently be guided through cover 12 of housing 10 or be provided at another suitable location.

In the installation state as intended, second admission device 40 is arranged above first admission device 30 so that heated storage medium 50 in housing 10 can flow from the top to the bottom. The flow is advantageous for control of the build-up and reduction of solid phase 52. Second admission device 40 is, in this example, arranged below level 11 of storage medium 50.

In principle, operation can also be carried out in reverse so that a changing operation can be carried out as a function of temperature and density of storage medium 50 in housing 10. In order to reverse the direction of flow, a reversal device 84 can be provided so that storage medium 50 can enter through first admission device 30 and storage medium can be guided out through second admission device 40. This can be carried out, for example, via a pump with reversal of the direction of rotation.

Figure 2:
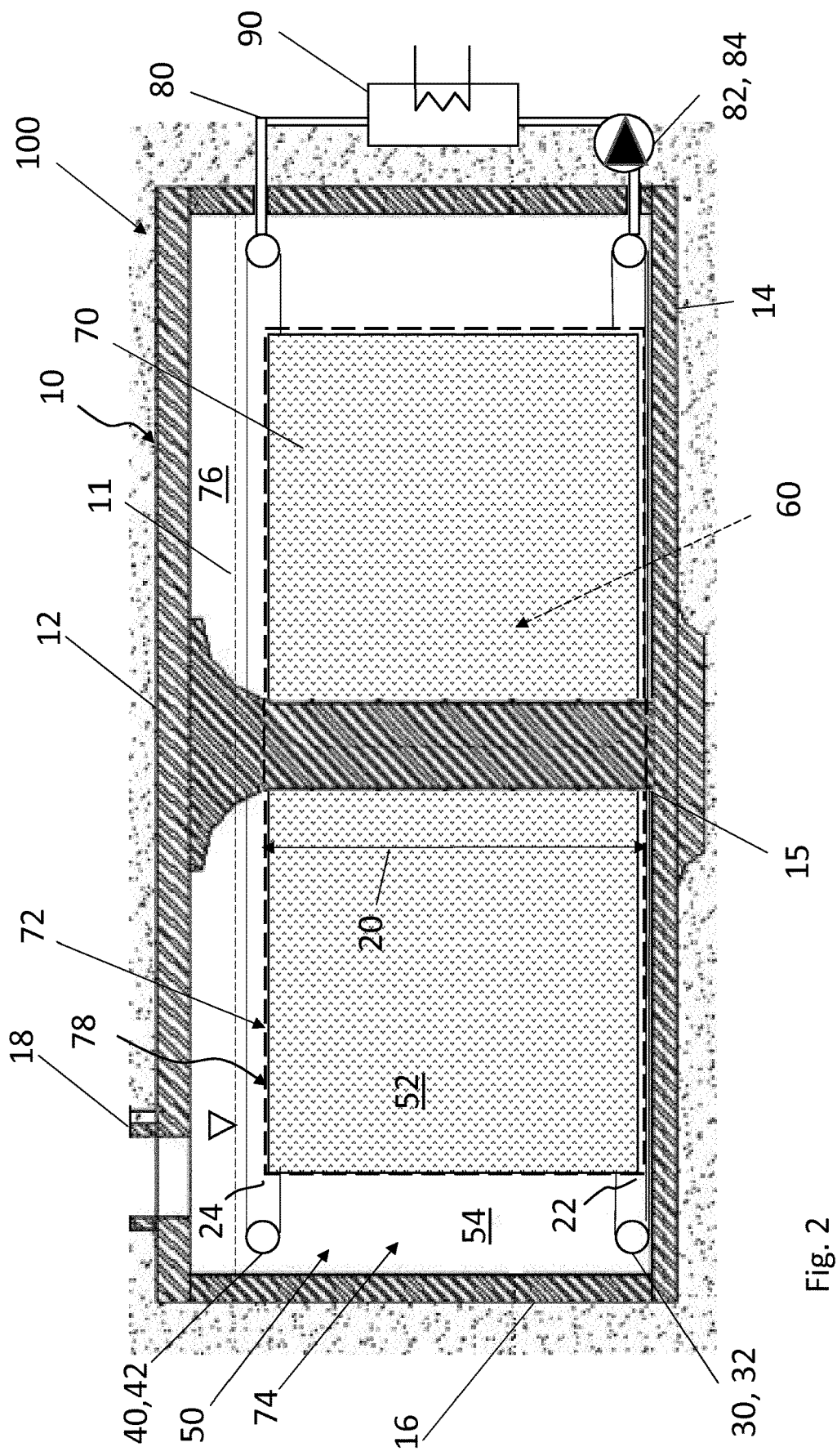
FIG. 2 shows, in sectional representation, the exemplary embodiment of the invention according to FIG. 1 with cylindrical solid phase of the storage medium in the first storage region.

FIG. 2 shows, in sectional representation, the exemplary embodiment of energy store 100 of the invention according to FIG. 1, in the case of which extraction heat exchanger 60 has transferred a provided maximum amount of storage medium 50 into solid phase 52. In order to avoid unnecessary repetition, reference is made to FIG. 1 for the description of the individual components of energy store 100.

With extraction heat exchanger 60 used it is possible to achieve controlled growth of solid phase 52 around heat exchanger tubes 62 (FIG. 1) of extraction heat exchanger 60, which finally coalesces, wherein solid phase 52 grows from the inside to the outside. Solid phase 52 of storage medium 50 forms, with extraction heat exchanger 60 described, a monolith in which extraction heat exchanger 60 is arranged.

Figure 3:
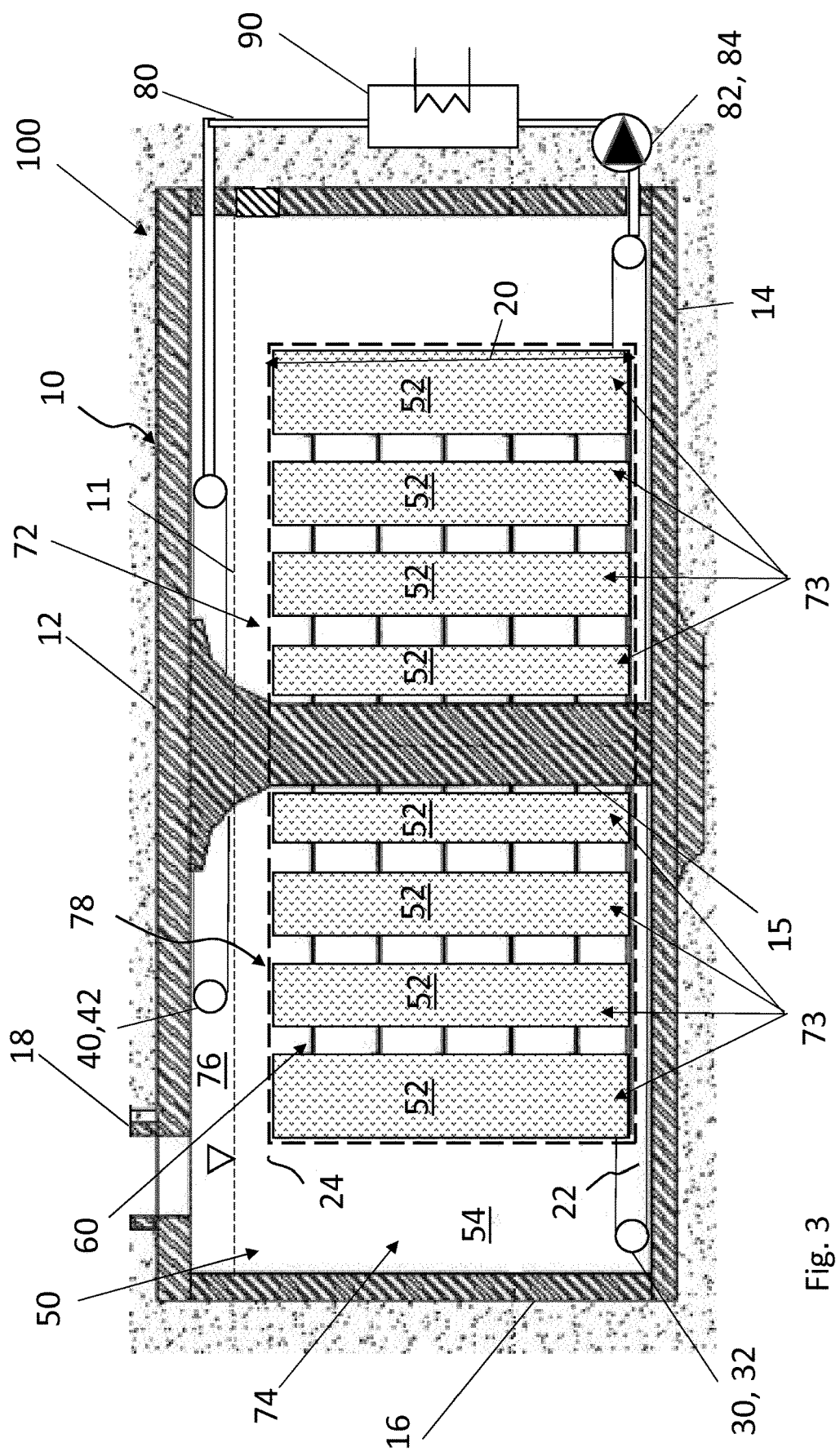
FIG. 3 shows a variant of the exemplary embodiment from FIG. 2 with solid phase of the storage medium in concentric cylinders in the first storage region.

FIG. 3 shows a variant of the exemplary embodiment from FIG. 2. In order to avoid unnecessary repetition, reference is made to FIG. 1 for the description of the individual components of energy store 100.

In the represented variant, solid phase 52 of storage medium 50 is not formed as a monolithic block as in FIG. 2, but rather as monolithic concentric shells 73, for example, as concentric cylinders. This can be achieved in that heat exchanger tubes 62 (FIG. 1) of extraction heat exchanger 60 are varied in a suitable manner in their spacings.

In the case of this variant, it can be very advantageous to arrange second admission device 40 in storage medium-free storage region 76 and admit heated storage medium 50 through it into housing 10.

Figure 4:
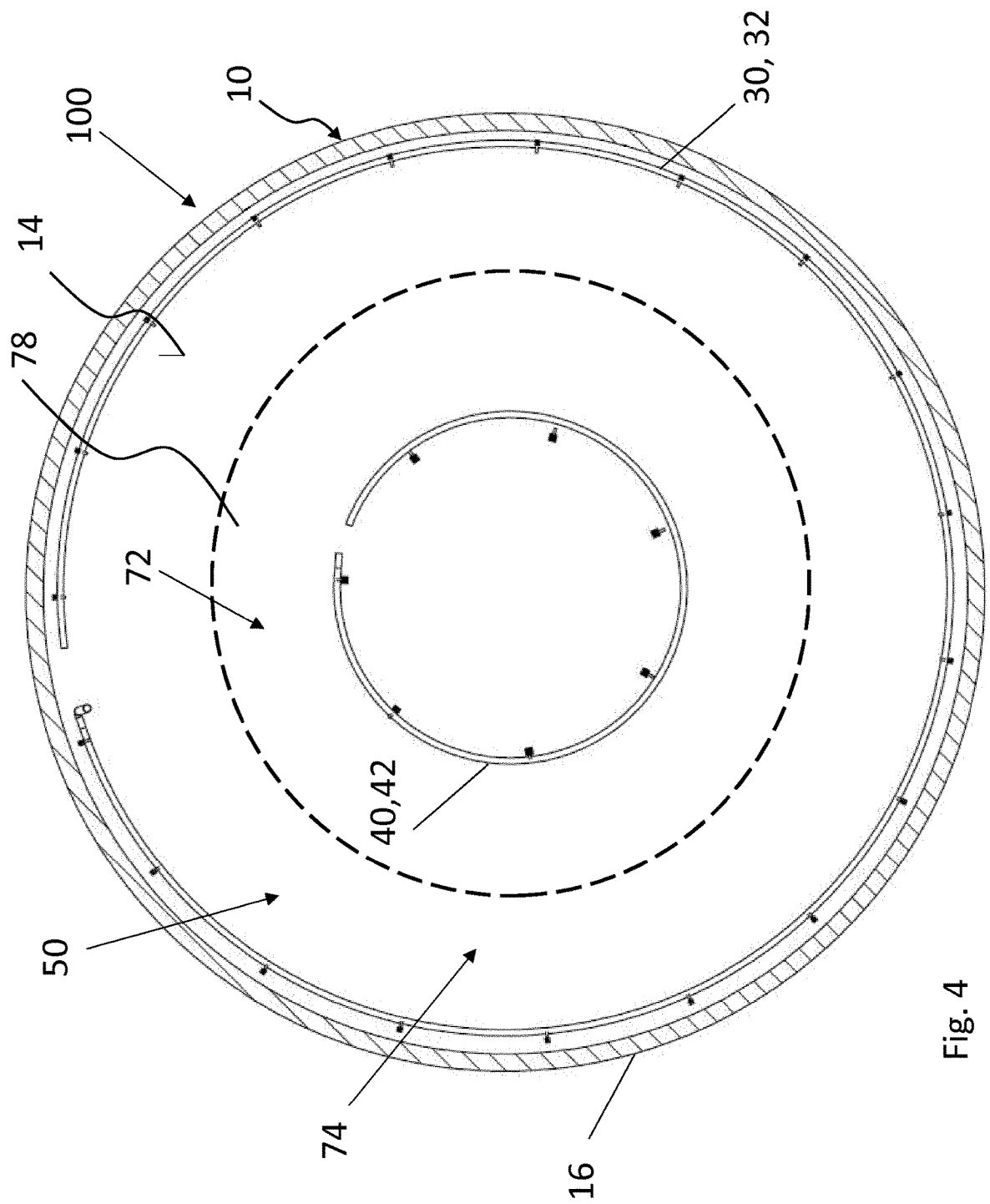
FIG. 4 shows, in top view, one variant of an arrangement of a first admission device and a second admission device in a housing.

FIG. 4 shows, in top view, a variant of an arrangement of first admission device 30 and second admission device 40, as is expedient for the configuration in FIG. 3.

First admission device 30 with an admission portion 32 is formed from an almost closed-circularly bent tube which is arranged spaced apart from housing 10 in second storage region 74. Second admission device 40 is formed from an admission portion 42 composed of an almost closed-circularly bent tube and indeed so that it is arranged within the cross-section of first storage region 72 and above it in the storage media-free storage region. If warm storage medium 50 escapes from second admission device 40, this can flow on both sides of the concentric cylinders in first storage region 72, which is advantageous for control of the growth of solid phase 52.

In the various configurations of energy store 100, one expedient operating method provides that heat is removed from energy store 100 in a discharge phase until energy store 100 is fully discharged and storage medium 50 is present in first storage region 72 in a cavity-free manner as solid phase 52. Solid phase 52 is formed continuously at extraction heat exchanger 60 transverse to longitudinal extension 20 of first storage region 72 growing from the inside to the outside. In second storage region 74, storage medium 50 is also present in the discharged state of energy store 100 as liquid phase 54. In the discharge phase, heat can also optionally be introduced via the open regeneration heat exchanger in second storage region 74 into storage medium 50 in order to influence the speed of the formation of solid phase 52 in first storage region 72.

In a subsequent regeneration phase, solid phase 52 in first storage region 72 is liquefied again until solid phase 52 in first storage region 72 is again present as liquid phase 54 of storage medium 50 by virtue of the fact that heat is supplied via the regeneration apparatus into storage medium 50. Liquefying solid phase 52 in first storage region 72 is carried put in reverse to the solidification in the discharge phase. In the regeneration phase, heat can optionally also be discharged out of storage medium 50 via extraction heat exchanger 60 in first storage region 72 in order to influence the speed of liquefaction of solid phase 52 in first storage region 72.

The invention claimed is:

1. An energy store with a housing, which surrounds a storage medium having latent heat in the case of a phase transition, which storage medium is provided during operation as intended for solidification into a solid phase and for melting into a liquid phase, with a first storage region in the interior of the housing, which is provided at least temporarily for solid phase of the storage medium and in which an extraction heat exchanger is arranged, which is provided for the extraction of heat from the storage medium, wherein the first storage region has a longitudinal extension which is oriented in the intended state of use as a vertical axis, with a second storage region in the interior of the housing, which is provided for liquid phase of the storage medium, if solid phase is present in the first storage region, wherein the second storage region is provided at least in regions as a shell around the first storage region, wherein at least one part of a regeneration apparatus is arranged in the second storage region, which regeneration apparatus is provided for the supply of heat into the storage medium, wherein the regeneration apparatus has at least one first and at least one second admission device for the liquid phase and at least one of the admission devices is arranged in the second storage region, wherein one of the admission devices is provided for the introduction of liquid phase into the housing and the other of the admission devices is provided for guiding liquid phase out of the housing, wherein the first and/or the second admission device has an admission portion with admission openings, which are opened toward the interior of the housing, for the liquid phase, wherein the admission portion is arranged with its longitudinal extension at least in regions about the vertical axis.

2. The energy store as claimed in claim 1, wherein the storage medium occupies a total volume in the fully liquid state in the first and second storage region, wherein the first storage region is provided such that the maximum intended volume of the solidified storage medium in the first storage region, relative to the total volume, is between at least 70% and at most 95% of the total volume.

3. The energy store as claimed in claim 1, wherein the first admission device and the second admission device are connected in terms of flow outside the first and second storage region by means of a flow connection.

4. The energy store as claimed in claim 1, wherein one of the admission devices is arranged adjacent to a first end of the longitudinal extension and the other of the admission devices is arranged adjacent to an opposite end of the longitudinal extension of the extraction heat exchanger.

5. The energy store as claimed in claim 1, wherein, in an intended installation state, the admission devices are arranged on top of one another in the direction of the longitudinal extension.

6. The energy store as claimed in claim 1, wherein at least one of the admission devices has an admission portion with admission openings for the storage medium which are distributed along a longitudinal extension of the admission portion, in particular are distributed equidistantly.

7. The energy store as claimed in claim 1, wherein one of the admission devices is arranged in a region in the housing which is free of storage medium during operation.

8. The energy store as claimed in claim 7, wherein the admission device is arranged above the first storage region and the admission portion of this admission device at least in regions overlaps a cross-section of the first storage region.

9. The energy store as claimed in claim 7, wherein the admission portion of the second admission device is adapted to a shape of the cross-section of the first storage region.

10. The energy store as claimed in claim 1, wherein the second admission device is provided for the introduction of the liquid phase into the housing and the first admission device is provided for guiding the liquid phase out of the housing.

11. The energy store as claimed in claim 1, wherein a switching device is provided to define a direction of flow of the liquid phase of the storage medium in the flow connection between first and second admission device.

12. The energy store as claimed in claim 1, wherein the solid phase of the storage medium in the first storage region is formed as a monolith.

13. The energy store as claimed in claim 1, wherein the first storage region is formed such that the solid phase of the storage medium forms, at the end of a defined solidification phase, concentric shells which are spaced apart by liquid phase.

14. The energy store as claimed in claim 1, wherein the flow connection of first admission device and second admission device comprises a heat exchanger.

15. The energy store as claimed in claim 1, wherein the first admission device is arranged spaced apart from the housing.

* * * * *